US010247228B2

(12) United States Patent
Yu et al.

(10) Patent No.: US 10,247,228 B2
(45) Date of Patent: Apr. 2, 2019

(54) BALL JOINT ASSEMBLY HAVING FRICTION COATED COMPONENTS AND METHODS OF ASSEMBLING A BALL JOINT ASSEMBLY HAVING DEFINED GAPS

(71) Applicants: HONDA MOTOR CO., LTD., Tokyo (JP); ZF FRIEDRICHSHAFEN AG, Stemwede-Dielingen (DE)

(72) Inventors: Jinghong Yu, Dublin, OH (US); Peter G. Langseth, III, Plain City, OH (US); Todd Fitz, Marysville, OH (US); Eric J. Walker, Dublin, OH (US); James W. Post, II, Dublin, OH (US); Bernd Grannemann, Stemwede (DE); Martin Rechtien, Stemwede (DE)

(73) Assignees: HONDA MOTOR CO., LTD., Tokyo (JP); ZF FRIEDRICHSHAFEN AG, Friedrichshafen (DE)

( * ) Notice: Subject to any disclaimer, the term of this patent is extended or adjusted under 35 U.S.C. 154(b) by 465 days.

(21) Appl. No.: 14/740,715

(22) Filed: Jun. 16, 2015

(65) Prior Publication Data
US 2016/0369837 A1 Dec. 22, 2016

(51) Int. Cl.
F16C 11/06 (2006.01)

(52) U.S. Cl.
CPC ...... *F16C 11/0647* (2013.01); *F16C 11/0604* (2013.01); *F16C 11/068* (2013.01); *F16C 11/0633* (2013.01); *F16C 11/0638* (2013.01); *F16C 11/0642* (2013.01);
(Continued)

(58) Field of Classification Search
CPC ..... Y10T 403/32713; Y10T 403/32721; Y10T 403/32737; Y10T 403/32786; Y10T 403/32803; F16C 11/0628; F16C 11/0633; F16C 11/0638; F16C 11/0642;
(Continued)

(56) References Cited

U.S. PATENT DOCUMENTS

| 3,102,744 A | 9/1963 | Reuter et al. |
| 3,389,928 A * | 6/1968 | Wehner .................. B60G 7/005 403/126 |
| 3,856,423 A | 12/1974 | Uchida |

(Continued)

FOREIGN PATENT DOCUMENTS

| CN | 103979007 A * | 8/2014 | ............... B62D 3/12 |
| DE | 10245983 A1 * | 4/2004 | .......... F16C 11/0647 |

(Continued)

*Primary Examiner* — Josh Skroupa
*Assistant Examiner* — Cory B Siegert
(74) *Attorney, Agent, or Firm* — Arent Fox LLP

(57) ABSTRACT

A ball joint assembly includes a housing at least partially defining a cavity. A ball stud includes a head portion positioned within the cavity and a shaft extending from the head portion. A ball race having an inner surface is positioned within the cavity to define an interface between the inner surface of the ball race and an outer surface of the head portion. A solid friction coating is positioned within the interface. The solid friction coating is coupled to the inner surface of the ball race and/or the outer surface of the head portion of the ball stud. A piston can also be positioned within the cavity, wherein at least one gap is defined between the ball race and the piston and/or between the ball race and the housing. Methods of assembling a ball joint assembly are also disclosed.

22 Claims, 11 Drawing Sheets

(52) U.S. Cl.
CPC ... *F16C 11/0685* (2013.01); *Y10T 403/32737* (2015.01); *Y10T 403/32786* (2015.01)

(58) Field of Classification Search
CPC . F16C 11/0647; F16C 11/0671; F16C 11/068; F16C 11/0685
USPC .................. 403/132, 133, 135, 141, 143
See application file for complete search history.

(56) References Cited

U.S. PATENT DOCUMENTS

| | | | |
|---|---|---|---|
| 3,944,376 A | 3/1976 | Hata | |
| 4,187,033 A | 2/1980 | Zukowski | |
| 4,231,673 A | 11/1980 | Satoh et al. | |
| 4,259,027 A | 3/1981 | Hata | |
| 4,395,142 A | 7/1983 | Lobeck | |
| 5,009,538 A | 4/1991 | Shirai et al. | |
| 5,230,580 A * | 7/1993 | Henkel | F16C 11/0614 29/451 |
| 5,265,965 A | 11/1993 | Harris et al. | |
| 5,482,379 A | 1/1996 | Harris et al. | |
| 5,551,791 A * | 9/1996 | Schneider | B62D 7/16 403/122 |
| 5,564,853 A | 10/1996 | Maughan | |
| 5,676,485 A * | 10/1997 | Lee | F16C 11/0642 277/635 |
| 5,758,986 A * | 6/1998 | Kraps | B60G 7/005 403/122 |
| 5,799,968 A | 9/1998 | Loeffler | |
| 5,839,845 A | 11/1998 | Kincaid et al. | |
| 5,904,436 A | 5/1999 | Maughan et al. | |
| 6,042,293 A * | 3/2000 | Maughan | F16C 11/068 403/135 |
| 6,098,045 A | 8/2000 | Yokomizo et al. | |
| 6,209,206 B1 | 4/2001 | Harris et al. | |
| 6,213,675 B1 | 4/2001 | Ungruh et al. | |
| 6,308,615 B1 | 10/2001 | Takenaka et al. | |
| 6,379,073 B1 | 4/2002 | Yoo et al. | |
| 6,398,446 B1 | 6/2002 | Pazdirek et al. | |
| 6,500,787 B1 | 12/2002 | Tanaka et al. | |
| 6,715,207 B2 | 4/2004 | Michioka et al. | |
| 6,860,638 B2 | 3/2005 | Fish | |
| 7,040,812 B2 | 5/2006 | Boshier et al. | |
| 7,182,518 B2 | 2/2007 | Lee et al. | |
| 7,473,035 B2 | 1/2009 | Lee et al. | |
| 7,476,050 B2 | 1/2009 | Ditzler | |
| 7,644,500 B2 | 1/2010 | Schmidt et al. | |
| 7,814,985 B2 | 10/2010 | Ditzler | |
| 7,845,875 B2 | 12/2010 | Julliere | |
| 8,047,739 B2 | 11/2011 | Sellers et al. | |
| 8,281,490 B2 | 10/2012 | Nishide et al. | |
| 8,616,799 B2 * | 12/2013 | Ersoy | B60G 7/005 403/137 |
| 2003/0138289 A1 | 7/2003 | Ronsheim | |
| 2004/0114992 A1 | 6/2004 | Ronsheim | |
| 2007/0163100 A1 | 7/2007 | Schmidt et al. | |
| 2007/0196633 A1* | 8/2007 | Coak | B05D 1/62 428/215 |
| 2009/0148085 A1 | 6/2009 | Smith et al. | |
| 2009/0232590 A1* | 9/2009 | Ersoy | F16C 11/0647 403/135 |
| 2010/0310305 A1 | 12/2010 | Mekid | |
| 2011/0142534 A1* | 6/2011 | Brogardh | F16C 11/0647 403/141 |
| 2011/0170944 A1* | 7/2011 | Oellers | B23K 11/14 403/122 |
| 2012/0076570 A1 | 3/2012 | Mekid | |
| 2012/0294557 A1 | 11/2012 | Soelch et al. | |
| 2014/0086667 A1* | 3/2014 | Elterman | F16C 11/0633 403/122 |

FOREIGN PATENT DOCUMENTS

| | | | |
|---|---|---|---|
| WO | WO 2013/173931 A1 | 11/2013 | |
| WO | WO 2014083907 A1 * | 6/2014 | ......... F16C 11/0638 |

* cited by examiner

BALL JOINT ASSEMBLY HAVING FRICTION COATED COMPONENTS AND METHODS OF ASSEMBLING A BALL JOINT ASSEMBLY HAVING DEFINED GAPS

BACKGROUND

This disclosure relates to ball joint assemblies and, more particularly, to ball joint assemblies having one or more friction coated components and methods for assembling a ball joint assembly having defined gaps within the ball joint assembly.

Ball joints have been widely used in various mechanical systems, such as automotive chassis systems, aircraft landing gear systems and agricultural machinery. The fundamental function of a ball joint is to connect two mechanical parts together while allowing relative rotational or rocking movement. Friction torque exists in any ball joint generally due to mechanical interference. Because friction torque in a ball joint often times has negative influence on the dynamic behavior of the mechanical system, there is generally a desire to minimize or reduce such friction torque. However, in certain assemblies, friction torque in a ball joint can be helpful for damping relative motion between ball joint components or adding resistance to the relative motion. In such cases, stable, predictable, and controllable friction torques are desired.

A conventional ball joint normally includes a ball stud positioned within a cavity defined by a housing. A ball race is positioned within the cavity at a first end of the housing and configured to cooperate with a ball portion of the ball stud. Grease or another liquid lubricant is applied between the ball portion of the ball stud and the ball race to reduce the friction torque between the ball stud and the ball race and improve the durability of the ball joint. In certain conventional ball joints, a second end of the housing is enclosed to prevent the grease or other lubricant from undesirably leaking from the housing.

In these conventional ball joints, the friction torque behavior of the ball joint varies with changes in properties of the grease, which can be greatly affected by temperature and/or pressure or force acting on the components. In many conventional ball joints, when the materials, dimensions, and/or surface roughness of the ball stud and/or the ball race are fixed, the friction coefficient between the ball stud and the ball race may depend on one or more factors, such as the grease viscosity, the normal load between the ball stud and the ball race, and the relative velocity between the ball stud and the ball race, for example.

As a result of these factors, there are a few inevitable drawbacks in establishing and/or controlling the friction torque of many conventional ball joints. One drawback is that the friction torque of the ball joint varies greatly with temperature. Usually, when temperature decreases, the grease viscosity increases and hence the friction torque increases. A second drawback is that the grease film thickness decreases and the friction torque of the ball joint increases with time when the ball stud continuously rotates or rocks relative to the ball race under a normal load applied between the ball stud and the ball race. A third drawback is that, before a sufficient grease film is formed, a breakaway friction torque is relatively high due to the increased friction coefficient between the ball stud and the ball race before the ball stud starts to move relative to the ball race. These drawbacks can cause an unstable friction torque, an unpredictable or uncontrollable friction torque, and/or severe wear on the ball stud and/or the ball race when a high normal load is applied between the ball stud and the ball race for a substantial period of time.

Therefore a need exists for a ball joint having a surface coating which allows the ball joint to have a friction torque which is stable both under varying temperatures and with continuous relative motion between the ball stud and the ball race under a high normal load. Further, there exists a need for a predictable friction torque of the ball joint for a given normal load applied between the ball race and the ball stud that is controllable by varying the normal load applied between the ball race and the ball stud.

SUMMARY

According to one embodiment, a ball joint assembly includes a housing at least partially defining a cavity. A ball stud includes a head portion positioned within the cavity and a shaft extending from the ball portion. A ball race having an inner surface is positioned within the cavity to define an interface between the inner surface of the ball race and an outer surface of the head portion. A solid friction coating is positioned within the interface. The solid friction coating is coupled to the inner surface of the ball race and/or the outer surface of the head portion.

According to one embodiment, a ball joint assembly includes a housing at least partially defining a cavity. A ball stud includes a head portion positioned within the cavity and a shaft extending from the ball portion. A ball race is positioned within the cavity and about at least a portion of the head portion of the ball stud. A solid friction coating is applied to an inner surface of the ball race and/or an outer surface of the head portion of the ball stud. A piston is positioned within the cavity. The piston is configured to seal an opening at a first end of the housing. At least one gap is defined between one or more of the following: an upper portion of the ball race and an inner surface of the piston and a lower portion of the ball race and an inner surface of the housing.

According to one embodiment, a method of assembling a ball joint is provided. The method includes configuring a housing to at least partially define a cavity. A head portion of a ball stud is positioned within the cavity. A ball race is positioned about at least a portion of the head portion of the ball stud. A piston is positioned within the cavity. The piston is configured to seal an opening at a first end of the housing. At least one gap is defined between one or more of the following: an upper portion of the ball race and an inner surface of the piston and a lower portion of the ball race and an inner surface of the housing.

According to one embodiment, a ball joint assembly includes a housing at least partially defining a cavity. A ball stud includes a head portion positioned within the cavity and a shaft extending from the head portion. A ball race is positioned within the cavity. The ball race is positioned about at least a portion of the head portion of the ball stud. A solid friction coating is applied to at least one of an inner surface of the ball race and an outer surface of the head portion of the ball stud. A piston is positioned within the cavity and configured to seal an opening at a first end of the housing. A central axis of the housing is defined between the first end of the housing and an opposing second end of the housing. The central axis extends through a centerline of the ball joint and parallel to an outer surface of the piston. A first angle A1 between an inner surface of the piston and the central axis is between 8 degrees and 15 degrees, a second angle A2 between an inner surface of the housing and the central axis is between 8 degrees and 15 degrees, a third angle B1 between an upper portion of the ball race and the central axis is between 8 degrees and 15 degrees, and a fourth angle B2 between a lower portion of the ball race and the central axis is between 8 degrees and 15 degrees. A first gap defines a difference in angle between B1 and A1, and a second gap defines a difference in angle between B2 and A2.

DESCRIPTION OF THE DRAWINGS

The disclosure may take physical form in certain parts and arrangement of parts, embodiments of which will be described in detail in this specification and illustrated in the accompanying drawings which form a part hereof and wherein:

FIG. 15 is a cross-sectional view of a portion of an exemplary ball joint assembly according to one embodiment wherein the angles B1 and A1 are substantially similar;

FIG. 18 is a cross-sectional view of a portion of an exemplary ball joint assembly according to one embodiment wherein the angles A2 and B2 are substantially similar.

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
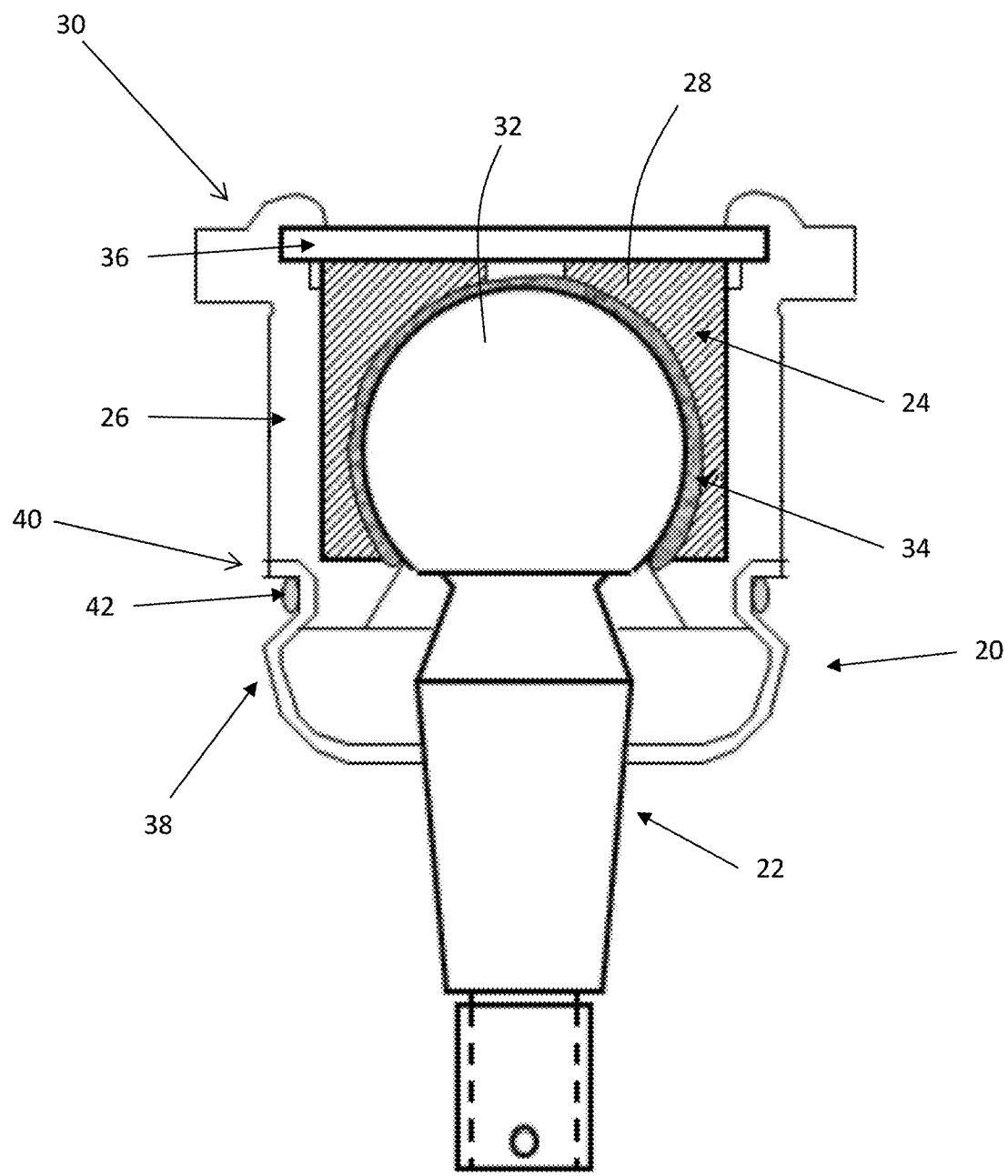
FIG. 1 is a partial sectional view of a conventional ball joint indicated as prior art.

Referring now to the drawings shown for purposes of illustrating embodiments of the disclosure only and not for purposes of limiting the same, and wherein like reference numerals are understood to refer to like components, FIG. 1 shows a conventional ball joint 20. The conventional ball joint 20 includes a ball stud 22 positioned within a cavity 24 defined by a housing 26. A ball race 28 is positioned within the cavity 24 at a first end 30 of the housing 26. The ball race 28 is configured to cooperate with a head portion 32 of the ball stud 22. A liquid lubricant, such as oil or grease 34, is applied between the ball stud 22 and the ball race 28. The grease 34 in the conventional ball joint 20 is meant to reduce the friction torque and improve the durability of the ball joint 20. However, the use of grease 34 in the conventional ball joint 20 may promote or cause: an unstable friction torque, an unpredictable or uncontrollable friction torque, and/or severe wear on the ball stud 22 and/or the ball race 28 when a relatively high normal load, such as 5000 Newtons is applied between the ball stud 22 and the ball race 28 for a substantial period of time. As shown in FIG. 1, a plug 36 is coupled to the first end 30 of the housing 26 and a dust boot 38 is coupled to an opposing second end 40 of the housing 26 by a dust boot clip 42 to enclose the cavity 24 and prevent or limit the grease 34 from undesirably leaking from the housing 26.

Figure 2:
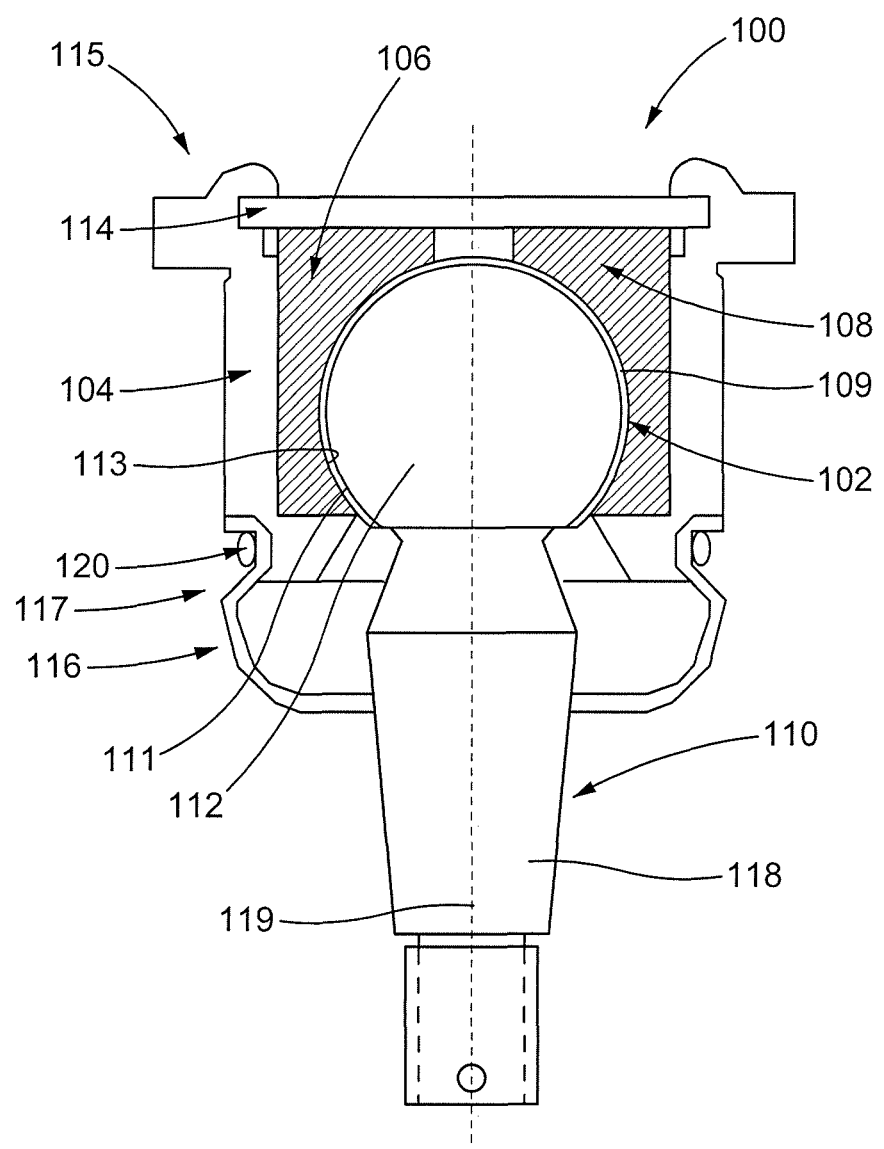
FIG. 2 is a partial sectional view of an exemplary ball joint assembly according to one embodiment having a solid friction coating applied to a head portion of a ball stud.
Figure 3:
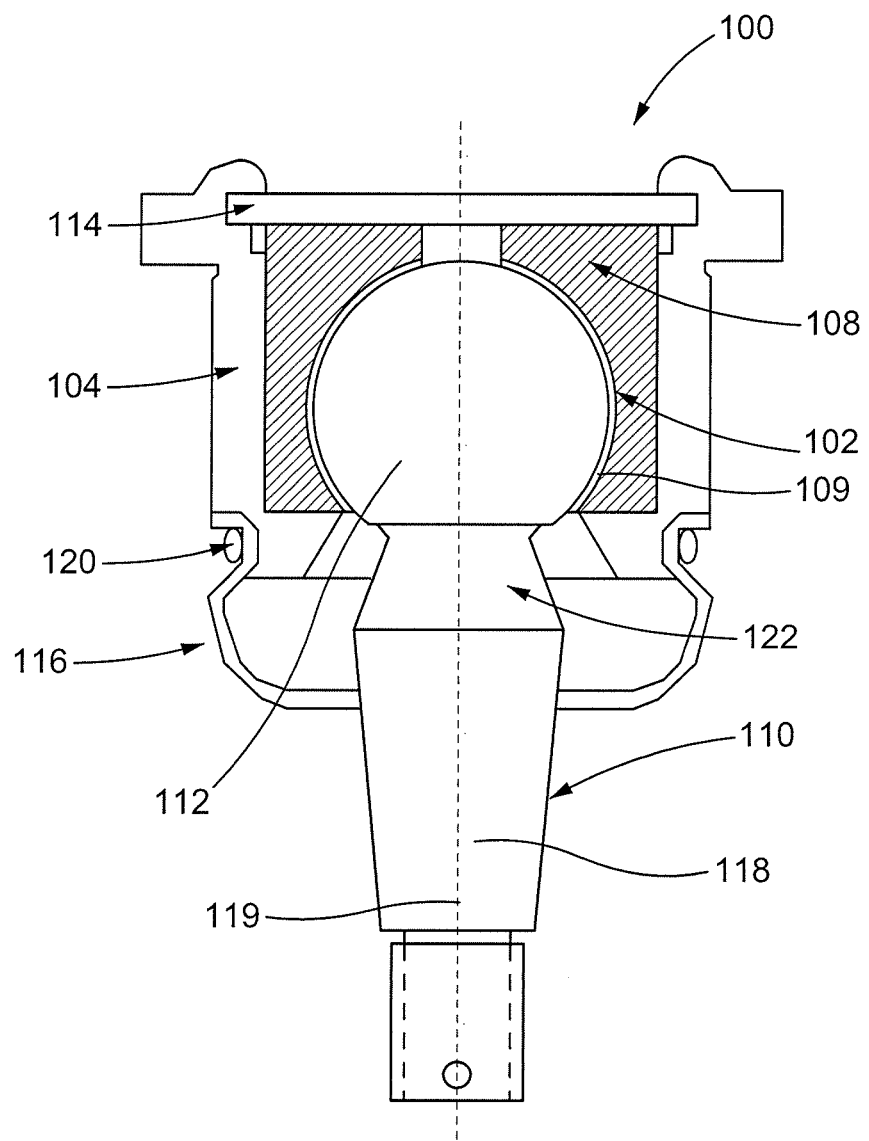
FIG. 3 is a partial sectional view of an exemplary ball joint assembly according to one embodiment having a solid friction coating applied to an inner surface of a ball race.
Figure 4:
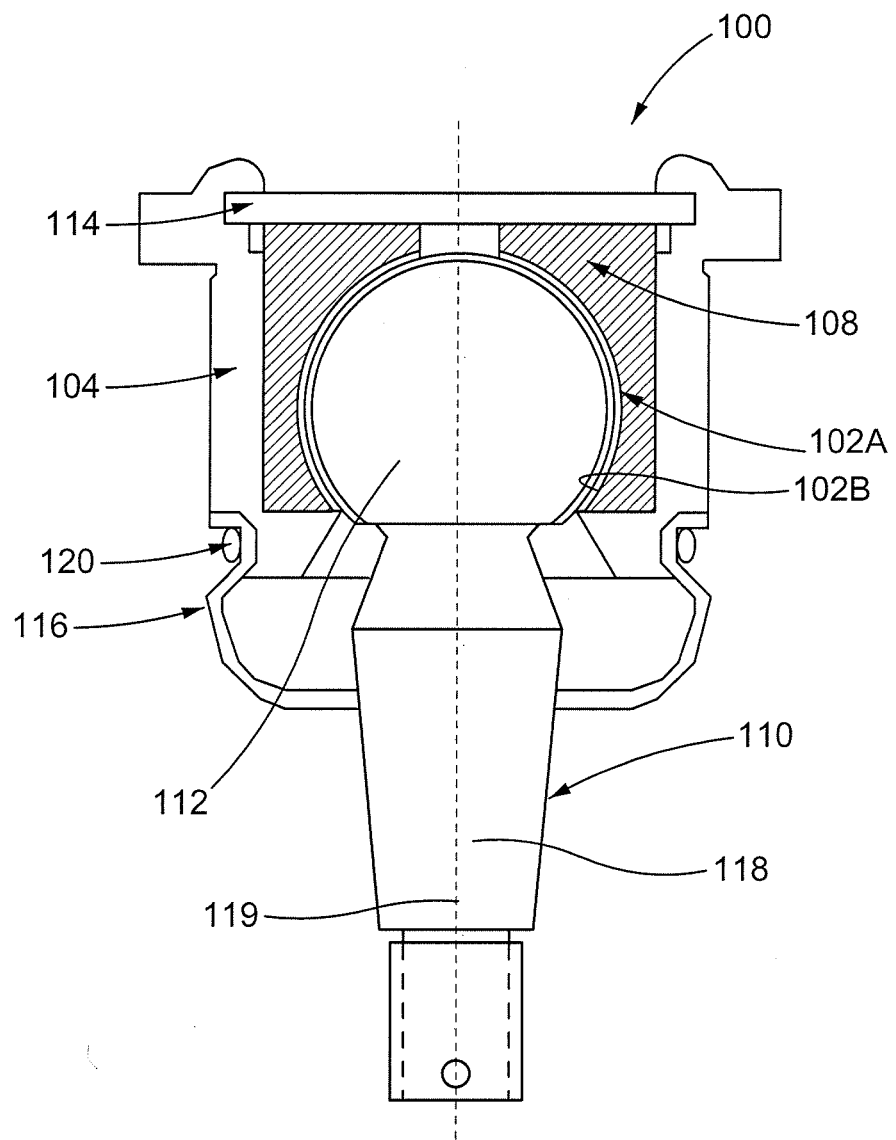
FIG. 4 is a partial sectional view of an exemplary ball joint assembly according to one embodiment having a solid friction coating applied to both a head portion of a ball stud and an inner surface of a ball race.
Figure 5:
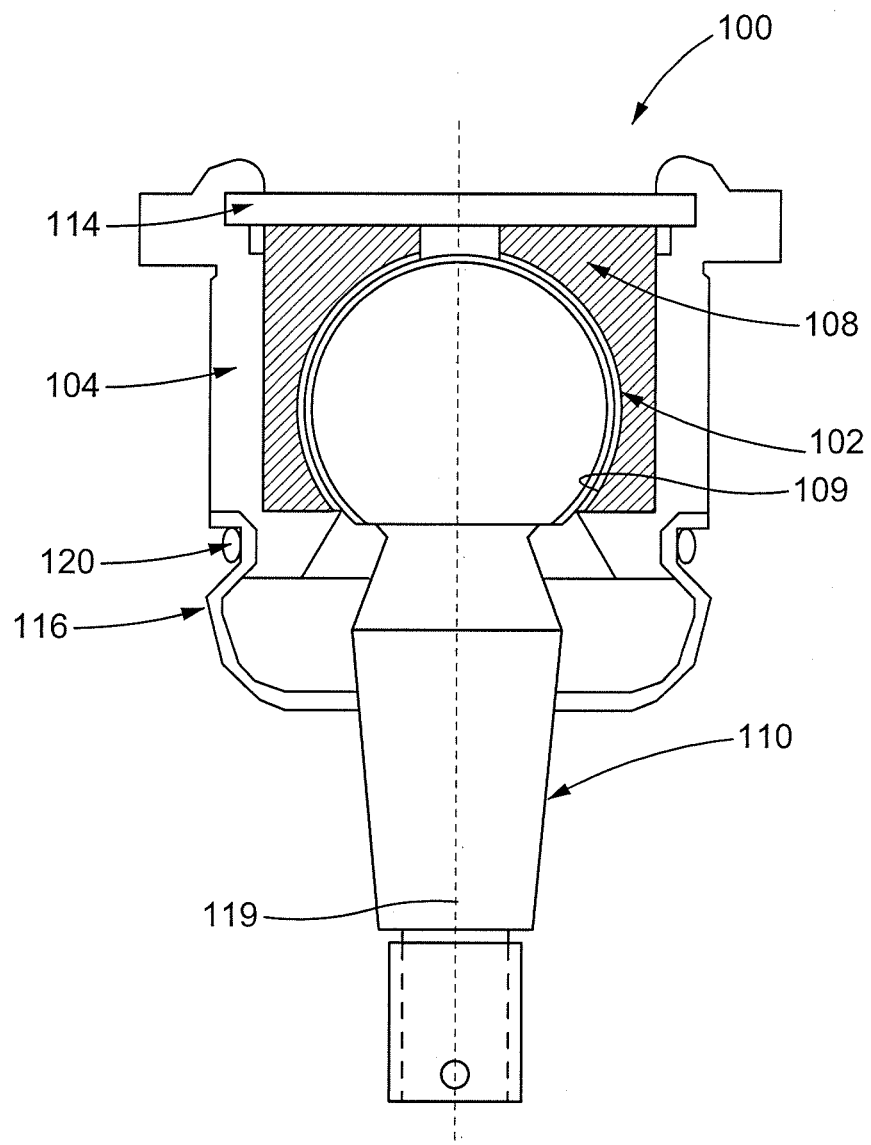
FIG. 5 is a partial sectional view of an exemplary ball joint assembly according to one embodiment wherein a ball race is formed of a substrate material forming a solid friction coating.

Referring now to FIGS. 2-19, and specifically to FIGS. 2-4, exemplary embodiments of a ball joint assembly 100 include a solid friction coating 102 applied to one or more surfaces of one or more components of the ball joint assembly 100. In certain embodiments, the solid friction coating 102 includes a suitable mixture of silicone dioxide and polytetrafluoroethylene. However, in alternative embodiments, the solid friction coating 102 can be made of any suitable material or component or combination of materials or components which are known in the art for this application. The term "solid" as used herein refers to the state of the solid friction coating 102 after the solid friction coating is applied to one or more components of the ball joint assembly and processed to final form. However, it should be understood that before the solid friction coating 102 has had the opportunity to solidify onto a component of the ball joint assembly, the solid friction coating can be in a liquid or fluid form to allow the friction coating to be applied onto one or more components. For example, in one embodiment, the solid friction coating begins as a liquid mixture before it is applied onto a component. Once the mixture is applied to the component, the component is baked at a suitable temperature until the solid friction coating 102 is formed on and adheres to the component in a solid form. One embodiment of the solid friction coating 102 includes a mixture of silicone dioxide and polytetrafluoroethylene available from Klüber, a German company, under the product name M01959/2011.

The ball joint assembly 100 includes a housing 104 at least partially defining a cavity 106. A ball race 108 is positioned within the cavity 106. The ball race 108 is configured to accept a ball stud 110 at least partially positioned within the cavity. In a particular embodiment, the ball race 108 is configured to accept a head portion 112 of the ball stud 110. In the embodiments shown, the head portion 112 has a spherical shape; however, in alternative embodiments the head portion 112 may have any suitable shape providing a suitable outer surface that allows the ball stud 110 to cooperate with the ball race 108 as intended. As shown in FIGS. 2-4, the ball race 108 has an inner surface 109 having a contour or profile that at least partially matches or follows a corresponding contour or profile of an outer surface 111 of the head portion 112 to facilitate cooperation between the ball race 108 and the head portion 112. The ball race 108 is positioned within the cavity 106 to define an interface 113 between the inner surface 109 of the ball race 108 and the outer surface 111 of the head portion 112.

The ball joint assembly 100 has a plug 114 coupled at or near a first end 115 of the housing 104 configured to at least partially seal the housing 104 to protect the ball joint components positioned within the cavity 106 from harsh environmental conditions and/or to limit entry of contaminants into the cavity 106. In one embodiment, a dust boot 116 is coupled at or near a second end 117 of the housing 104 opposite the first end 115. The dust boot 116 is configured to at least partially seal the housing 104 and further protect the ball joint components positioned within the cavity 106 from harsh environmental conditions and/or to limit entry of contaminants into the cavity 106. As shown in FIGS. 2-4, the dust boot 116 defines an opening through which a shaft 118 of the ball stud 110 extends. In certain embodiments, the dust boot 116 is coupled to the second end 117 of the housing 104 using a suitable coupling mechanism or fastener, such as a dust boot clip 120. A center line 119 is defined through a length of the ball joint assembly 100 parallel to an outer wall of the housing 104.

In the embodiment of the ball joint assembly 100 shown in FIG. 2, the solid friction coating 102 is applied directly onto the head portion 112 of the ball stud 110. In the embodiment of the ball joint assembly 100 shown in FIG. 3, the solid friction coating 102 is applied directly onto the inner surface 109 of the ball race 108. In the embodiment of the ball joint assembly 100 shown in FIG. 4, the solid friction coating 102 is applied directly onto at least the outer surface 111 of the head portion 112 of the ball stud 110 and the inner surface 109 of the ball race 108. In an alternative embodiment shown in FIG. 5, the ball race 108 is formed of a substrate material including the solid friction coating 102.

More specifically, in this embodiment, the solid friction coating 102 includes a suitable polymer material forming the ball race 108 and the inner surface 109 of ball race 108.

Figure 6:
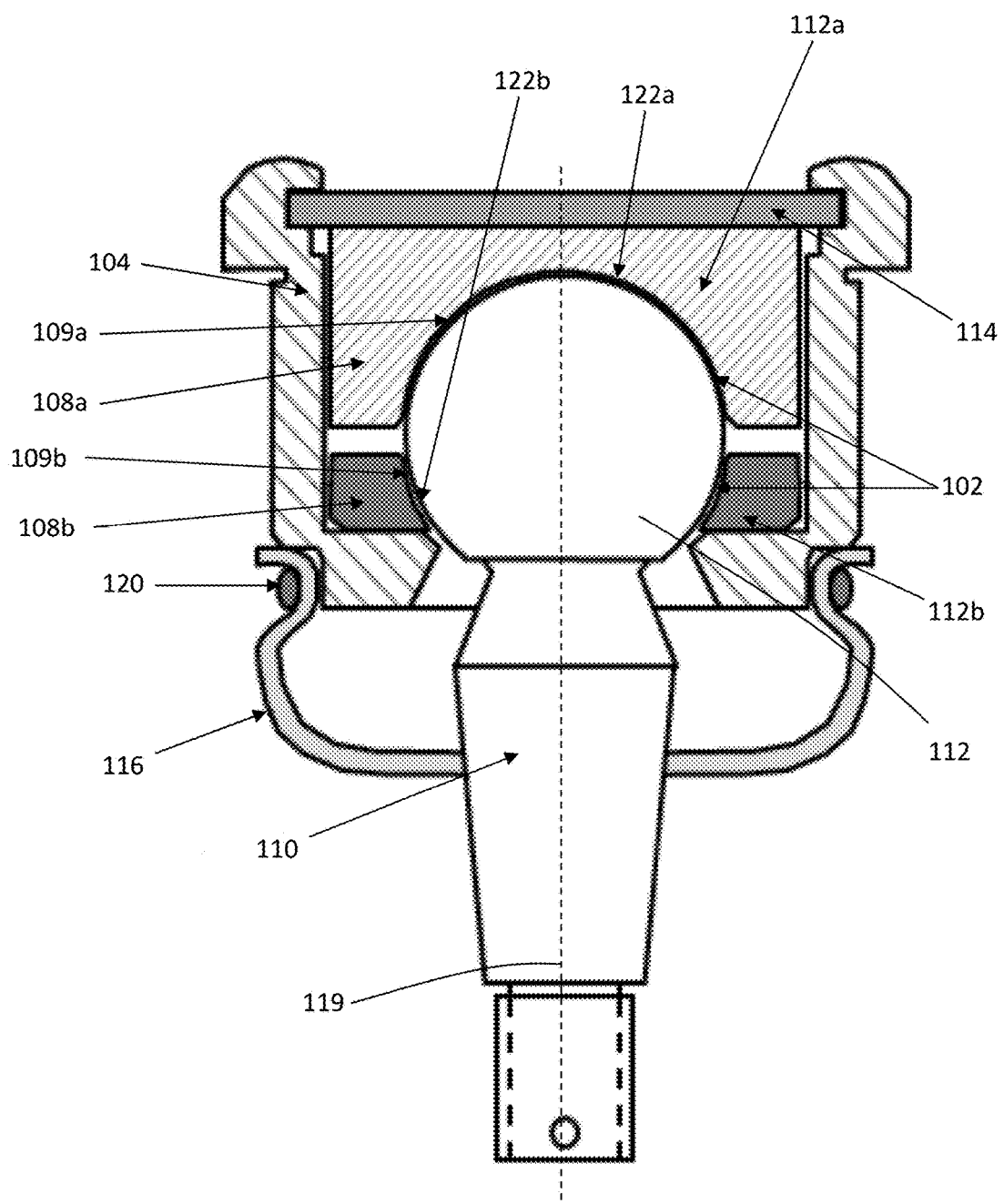
FIG. 6 is a partial sectional view of an exemplary ball joint assembly according to one embodiment having an upper ball race and a lower ball race.

Referring now to FIG. 6, in an alternative embodiment, the ball race 108 includes a first or upper ball race section 108a positioned about a first portion 112a of the head portion 112 and a second or lower ball race section 108b positioned about a second portion 112b of the head portion 112. In this embodiment, the solid friction coating 102 is applied onto at least the head portion 112 of the ball stud 110, at least a portion of the upper ball race section 108a, such as an inner surface 109a of the upper ball race section 108a, at least a portion of the lower ball race section 108b, such as an inner surface 109b of the lower ball race section 108b, or any suitable combination of the head portion 112, the inner surface 109a of the upper ball race section 108a, and the inner surface 109b of the lower ball race section 108b, for example.

Figure 7:
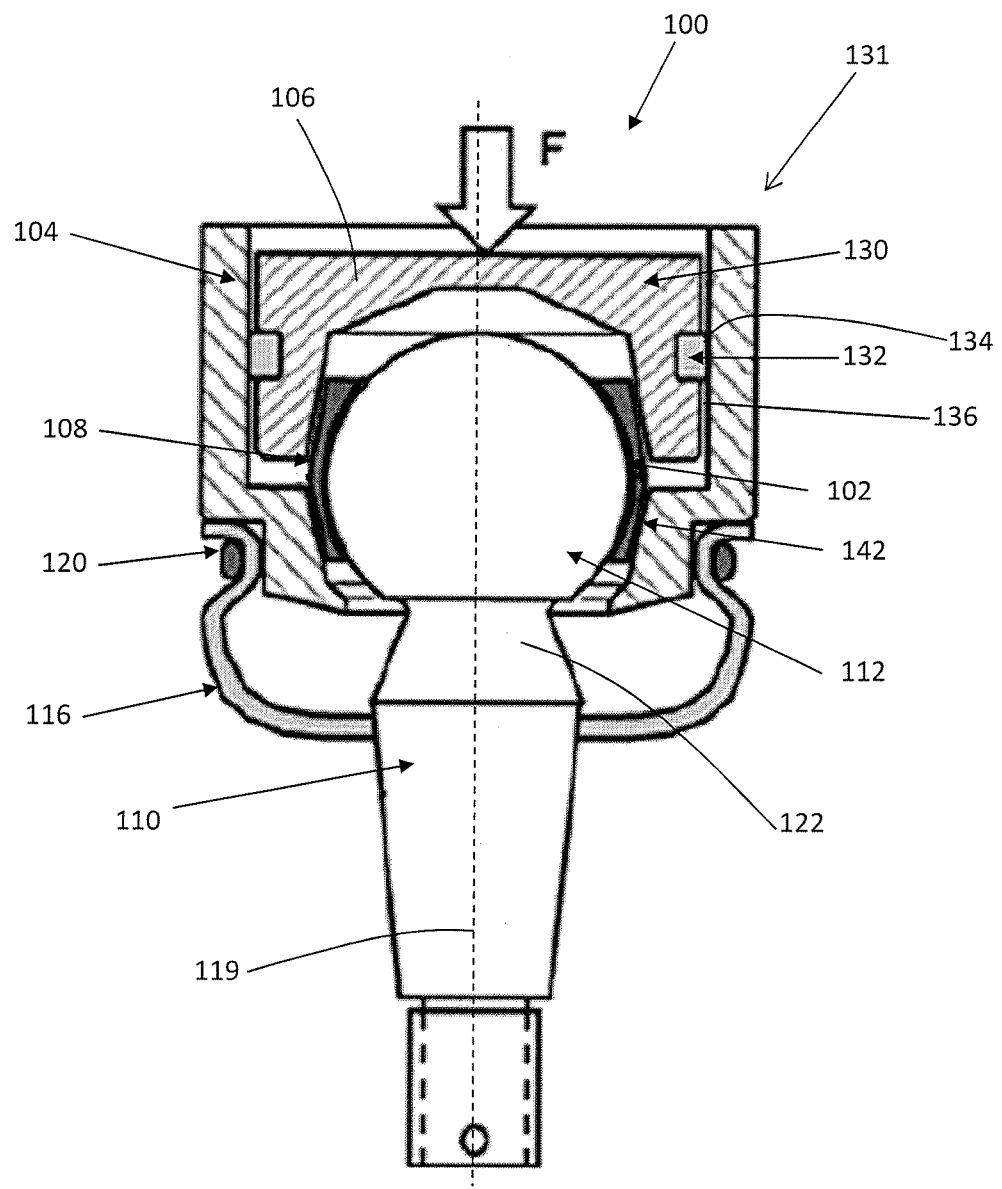
FIG. 7 is a partial sectional view of an exemplary ball joint assembly according to one embodiment having a movable piston and showing a force applied to the piston.
Figure 8:
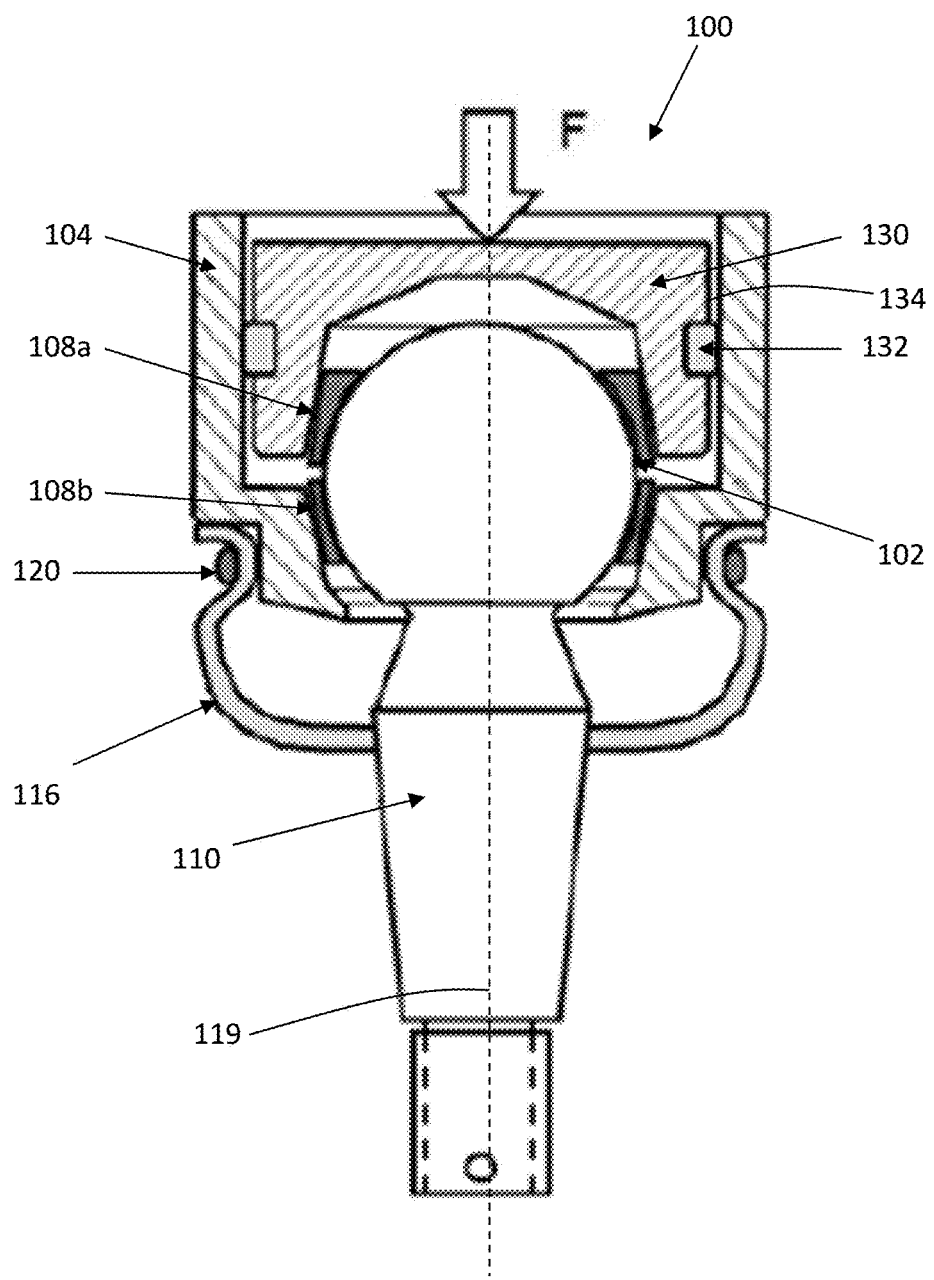
FIG. 8 is a partial sectional view of an exemplary ball joint assembly according to one embodiment having a movable piston and showing a force applied to the piston.

Referring now to FIGS. 7 and 8, in alternative embodiments, the ball joint assembly 100 includes a piston 130 movably positioned within the cavity 106 at the first end 131 of the housing 104. In the embodiment shown in FIG. 7, the piston 130 is configured to engage at least a portion of the ball race 108. In the embodiment shown in FIG. 8, the piston 130 is configured to engage only the upper ball race section 108a. As shown in FIGS. 7 and 8, a suitable gasket, such as a piston ring 132 or an O-ring (not shown), is positioned about an outer surface 134 of the piston 130 and configured to at least partially seal the housing 104 to protect the ball joint components positioned within the cavity 106 from harsh environmental conditions and/or to limit entry of contaminants into the cavity 106. In one embodiment, the piston ring 132 has a rectangular cross-sectional area as shown in FIGS. 7 and 8. Further, the piston ring 132 also helps to prevent or limit tilting of the piston 130 within the cavity 106. However, the piston ring 132 is optional, and in an alternative embodiment, the piston ring 132 is removed and the solid friction coating 102 is applied on the outer surface 134 of the piston 130, an inner surface 136 of the housing 104 or both the outer surface 134 of the piston 130 and the inner surface 136 of the housing 104. In a particular embodiment, the solid friction coating 102 is applied to the entire interface between the outer surface 134 of the piston 130 and the inner surface 136 of the housing 104.

In a particular embodiment of the ball joint assembly 100 shown in FIG. 7, one or more anti-rotation keys (not shown) are positioned between the piston 130 and the ball race 108, and/or between an engagement surface 142 of the housing 104 and the ball race 108. Similarly, in one embodiment of the ball joint assembly 100 shown in FIG. 8, one or more anti-rotation keys (not shown) are positioned between the piston 130 and the upper ball race section 108a and/or between the engagement surface 142 of the housing 104 and the lower ball race section 108b. These anti-rotation keys prevent or limit undesirable relative rotational movement between the piston 130, the ball race 108, and/or the housing 104.

Referring to FIGS. 7 and 8, in one embodiment the ball joint assembly 100 includes one or more sensors (not shown) integrated with the ball joint assembly 100, for example positioned within the housing 104. These sensors may include any suitable type of sensor known to those having ordinary skill in the art. In an exemplary embodiment, these sensors include one or more of a temperature sensor, a force sensor, and/or a displacement sensor. In a particular embodiment, a force actuator (not shown) is connected to the ball joint assembly 100 to provide a controllable pushing force on the piston 130.

With continuing reference to FIGS. 7 and 8, the piston 130 and the ball race 108 shown in FIG. 7 or the piston 130 and the upper ball race section 108a shown in FIG. 8 have conical engagement surfaces. The conical engagement surfaces facilitate controlling the friction torque of the ball joint assembly 100 with sufficient accuracy to achieve an appropriate or desired ratio of rocking friction torque to rotational friction torque as described below with reference to FIGS. 9-19.

Figure 9:
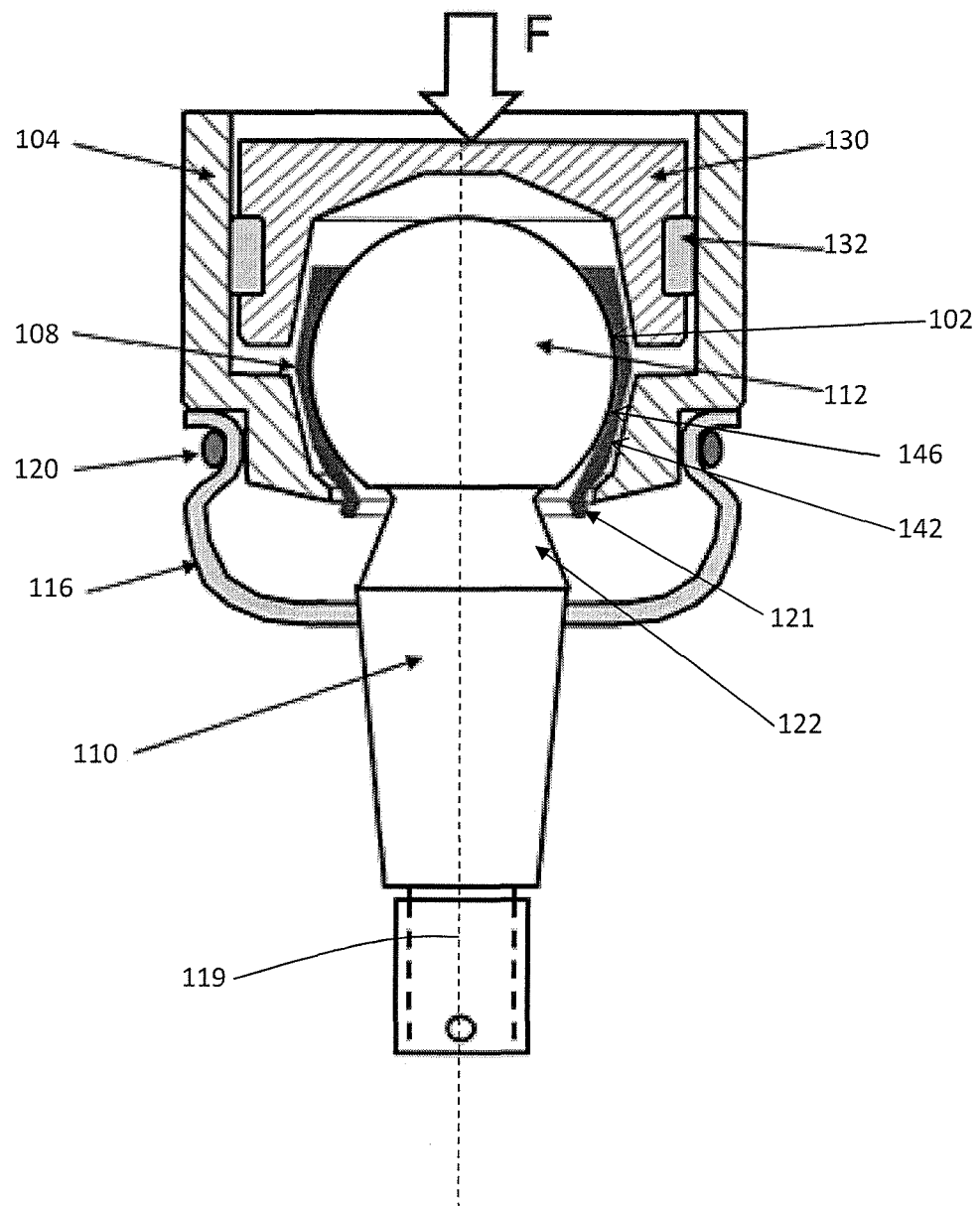
FIG. 9 is a partial sectional view of an exemplary ball joint assembly according to one embodiment having a ball race which extends beyond an outer edge of a ball joint housing.

FIG. 9 is an alternative embodiment of the ball joint assembly in which the ball race 108 extends substantially to or beyond an outer edge 121 of the housing 104. In this embodiment, the ball race 108 operates as a cushion between a neck 122 of the ball stud 110 and the housing 104 to prevent excessive noise caused when the ball stud 110 rotates towards the outer edge 121 of the housing 104.

Figure 10:
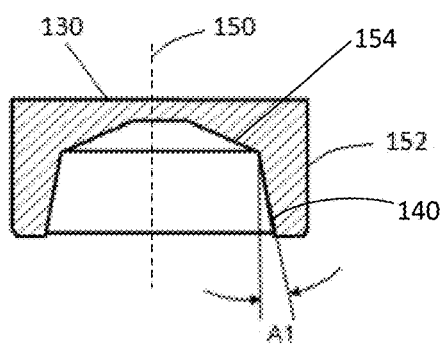
FIG. 10 is a cross-sectional view of a portion of the exemplary ball joint assembly shown in FIG. 7 showing an angle A1.

FIG. 10 is a cross-sectional view of a portion of an exemplary ball joint assembly, such as shown in FIG. 9, showing an angle A1 of an engagement surface 140 of the piston 130 with respect to a first or central axis 150 of the housing 104 defined between the first end 115 of the housing 104 and the opposing second end 117 of the housing 104. The central axis 150 extends through the centerline 119 of the ball joint assembly 100, shown in FIGS. 2-9, and parallel to an outer surface 152 of the piston 130, shown in FIG. 10.

There are angular differences between an inner surface 140 of the piston 130 and the central axis 150 of the housing 104 and between an outer surface of the ball race 108 and the central axis of the housing. A1 is an example of such an angular difference. The angular differences create gaps which reduce the pressure of the ball race 108 on the head 112 of the ball stud 110 when a lower pre-load force is applied to the ball joint 100. This lower pressure on the ball stud 110 allows for lower operating values of rotation friction torque.

Figure 11:
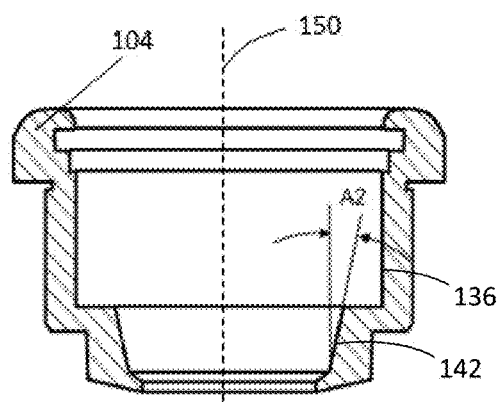
FIG. 11 is a cross-sectional view of a portion of an exemplary ball joint assembly according to one embodiment showing an angle A2.
Figure 12:
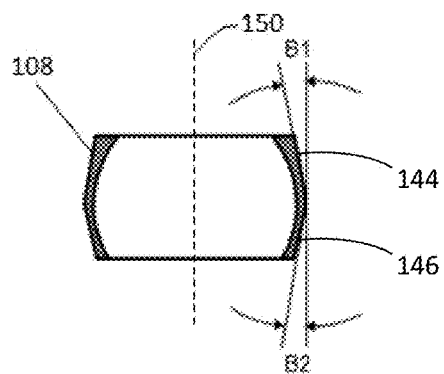
FIG. 12 is a cross-sectional view of a portion of the exemplary ball joint assembly shown in FIG. 7 showing an angle B1 and an angle B2.
Figure 13:
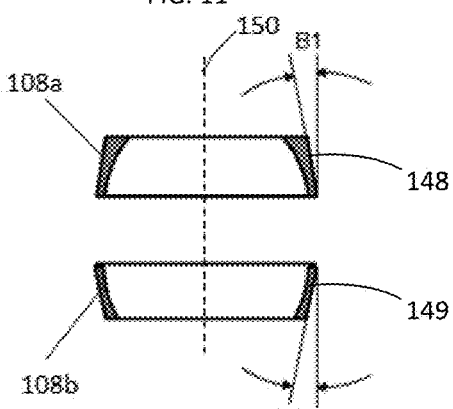
FIG. 13 is a cross-sectional view of a portion of the exemplary ball joint assembly shown in FIG. 8 showing an angle B1 and an angle B2.

FIG. 11 is a cross-sectional view of a portion of an exemplary ball joint assembly according to one embodiment showing an angle A2 of the engagement surface 142 of the housing 104 with respect to central axis 150. FIG. 12 is a cross-sectional view of a portion of an exemplary ball joint assembly, such as shown in FIG. 9, showing an angle B1 of a first engagement surface 144 of the ball race 108 with respect to the central axis 150 and an angle B2 of a second engagement surface 146 of the ball race 108 with respect to the central axis 150. FIG. 13 is a cross-sectional view of a portion of an exemplary ball joint assembly, such as shown in FIG. 8, showing an angle B1 of a first engagement surface 148 of the upper ball race section 108a with respect to the central axis 150 and an angle B2 of a second engagement surface 149 of the lower ball race section 108b with respect to the central axis 150.

In order to assemble an exemplary ball joint 100, such as the ball joint 100 shown in FIGS. 8 and 9, a housing 104 is configured to at least partially define a cavity 106. Within this cavity 106 is a head portion 112 of a ball stud 110. A ball race 108 is then positioned about at least a portion of the head portion 112 of the ball stud 110. Next, a piston 130 is positioned within the cavity 106, wherein the piston 130 is configured to seal an opening at a first end 115 of the housing 104. The piston 130 and the ball race 108 are positioned within the cavity 106 to define at least one gap between on or more of the following: the piston 130, the ball race 108, and the housing 104.

For example, a first angle A1 is defined between an inner surface 140 of the piston 130 and the central axis 150, defined between the first end 115 of the housing 104 and an opposing second end 117 of the housing 104. In one embodiment, the first angle A1 is between 8 degrees and 15 degrees. A second angle A2 is defined between an inner surface of the housing and the central axis between 8 degrees and 15 degrees. A third angle B1 is defined between an upper portion of the ball race and the central axis between 8 degrees and 15 degrees. A fourth angle B2 is defined between a lower portion of the ball race and the central axis between 8 degrees and 15 degrees.

FIGS. 10-13 illustrate closer views of angle A1, angle A2, angle B1, and angle B2. Central axis 150 extends through the centerline 119 of the ball joint assembly 100 and is parallel to an outer wall 152 of the piston 130 as shown in FIG. 10, or an interior surface 136 of the housing 104 as shown in FIG. 11. In order to achieve a wide range of rotation friction torque, between 1 Nm and 70 Nm, of the ball joint assembly under a variable pushing load, F, the wedge angle of the piston 130, the wedge angle of the housing 104, and the wedge angles of the ball race A1, A2, B1, and B2 are designed within a range of degrees. In one embodiment, each of angle A1, angle A2, angle B1, and angle B2 is between 5 degrees and 20 degrees, or, more specifically, between 8 degrees and 15 degrees, or, even more specifically, between 10 degrees and 13 degrees. Referring again to FIGS. 7 and 8, a controllable and variable pushing force F can act on the piston 130 so that the normal load between the ball stud 110 and the ball race 108, or between the ball stud 110 and the upper ball race section 108a and the lower ball race section 108b is variable and controlled. As a result, the friction torque of the ball joint assembly 100 is variable and controllable.

Figure 14:
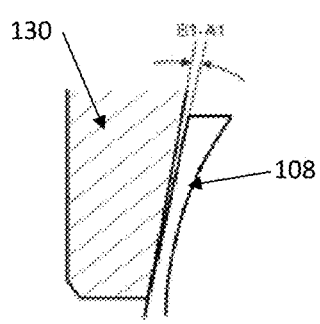
FIG. 14 is a cross-sectional view of a portion of the exemplary ball joint assembly shown in FIG. 9 showing a difference between angles B1 and A1.
Figure 15:
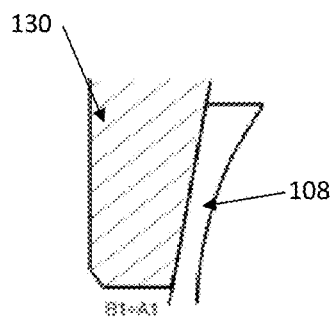
Figure 16:
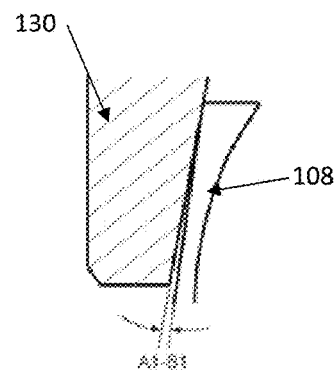
FIG. 16 is a cross-sectional view of a portion of the exemplary ball joint assembly shown in FIG. 9 showing a difference between angles A1 and B1.
Figure 17:
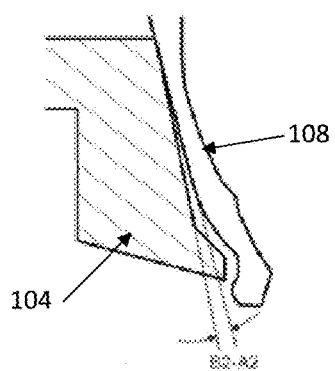
FIG. 17 is a cross-sectional view of a portion of the exemplary ball joint assembly shown in FIG. 9 showing the difference between angles B2 and A2.
Figure 18:
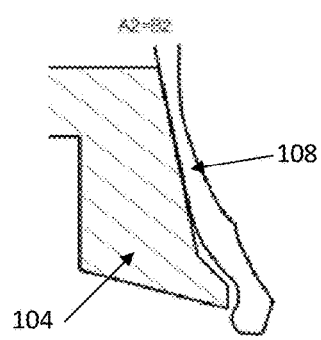
Figure 19:
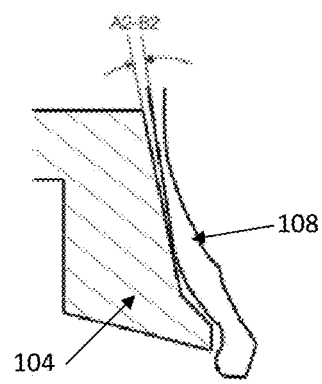
FIG. 19 is a cross-sectional view of a portion of the exemplary ball joint assembly shown in FIG. 9 showing a difference between angles A2 and B2.

FIGS. 14-19 illustrate closer views of selected differences between angle A1, angle A2, angle B1, and angle B2. FIG. 14 illustrates one embodiment wherein angle B1 is slightly greater than angle A1. FIG. 15 illustrates one embodiment wherein angle B1 is substantially equal to angle A1. FIG. 16 illustrates one embodiment wherein angle B1 is slightly less than angle A1. FIG. 17 illustrates one embodiment wherein angle B2 is slightly greater than angle A2. FIG. 18 illustrates one embodiment wherein angle B2 is substantially equal to angle A2. FIG. 19 illustrates one embodiment wherein angle B2 is slightly less than angle A2. When the ball joint assembly 100 is under a relatively greater ball joint preload condition, angle B1 has a tendency to approach angle A1, and angle B2 has a tendency to approach angle A2 due to the elasticity of the material of the ball race 108. In certain embodiments, at least one gap is defined between one or more of the following: an upper portion of the ball race 108 and an inner surface of the piston 130 and a lower portion of the ball race 108 and an inner surface of the housing 104. For example, a first gap may be defined between an upper portion of the ball race 108 and an inner surface of the piston 130 and, alternatively or in addition, a second gap may be defined between a lower portion of the ball race 108 and an inner surface of the housing 104. In a particular embodiment, a first gap is defined between a first ball race portion 108a and an inner surface of the piston 130 and, alternatively or in addition, a second gap is defined between a second ball race portion 108b and an inner surface of the housing 104.

In one embodiment, a difference in values between angle A1 and angle B1 defining a first gap between an upper portion of the ball race and an inner surface of the piston and between angle A2 and angle B2 defining a second gap between a lower portion of the ball race and an inner surface of the housing are less than 10 degrees, or, more specifically, less than 5 degrees, or, even more specifically, less than 2 degrees. In another embodiment, the differences between angles A1 and B1, and between angles A2 and B2 are substantially zero. In other words, in this embodiment, angles A1 and B1, and angles A2 and B2, respectively, are substantially similar. FIGS. 14 and 16 show a cross-sectional view of a portion of the exemplary ball joint assembly similar to the ball joint assembly shown in FIG. 9, showing the difference between angles B1 and A1. While FIGS. 14 and 16 illustrate one embodiment using a single ball race 108, these illustrations apply equally to alternative embodiments of the ball joint assembly 100 having the upper ball race 108a and the lower ball race 108b. FIG. 15 is a cross-sectional view of a portion of the exemplary ball joint assembly similar to the ball joint assembly shown in FIG. 7, showing one embodiment wherein angle B1 is substantially equal to angle A1.

FIGS. 17 and 19 show a cross-sectional view of a portion of the exemplary ball joint assembly similar to the ball joint assembly shown in FIG. 9, showing the difference between angles B2 and A2. While FIGS. 17 and 19 illustrate one embodiment using a single ball race 108, these illustrations apply equally to alternative embodiments of the ball joint assembly 100 having the upper ball race 108a and the lower ball race 108b. FIG. 18 is a cross-sectional view of a portion of the exemplary ball joint assembly similar to the ball joint assembly shown in FIG. 9, showing one embodiment where there is little to no difference between angles B2 and A2.

As shown in FIGS. 15 and 18, when the ball race is under zero preload condition, angle B1 is equal to or slightly different from angle A1, and angle B2 is equal to or slightly different from angle A2. In one embodiment, the difference between angle B1 and angle A1 and the difference between angle B2 and angle A2 is between −2 degrees to 2 degrees. The difference between the specific angles A1 and B1 and A2 and B2 provide gaps which facilitate a wide range of torques by releasing pressure on the ball stud 110. Without the gap, the ball race would apply pressure to the ball stud even when a low pre-load force is applied, which prevents the system from allowing a desired low torque value to be used. For example, when a large pre-load force is applied, the gap between angles A1 and B1 and A2 and B2 essentially disappears, and the elasticity of the friction coating and of the ball race material itself allows for a substantially matching interface between the ball race 108 and the head portion 112 of the ball stud 110. When there is a lower pre-load force applied, the gap reduces the pressure of the ball race 108 on the head portion 112 of the ball stud 110 thus reducing torque when compared to a ball race 108 with no gap and configured to match the shape of the ball stud 110 to the extent desired when a high pre-load force is applied. This lower pressure on the ball stud 110 allows for lower operating values of rotation friction torque which can now operate in the range of 0-1 Nm.

Compared to a conventional ball joint, such as the conventional ball joint 20 disclosed above, the ball joint assembly 100, according to various embodiments, has greater stability and more predictable friction torque characteristics. For instance, temperature may greatly influence the viscosity of the grease or lubricant contained in a conventional ball joint but has little to no effect on the state or properties of the solid friction coating 102. Further, in the conventional ball joint 20, with a relatively high normal load present between the ball stud 22 and the ball race 28, continuous or repeated movement for a number of cycles of the ball joint 20 (rotational movement and/or rocking movement) may urge at least a portion of the grease 34 out from the space between the ball stud 22 and the ball race 28. Loss of the grease 34 causes the grease layer to become increasingly thinner, and consequently the friction torque, in turn, to become increasingly greater. However, this is not the case for the ball joint 100. In the present disclosure, a relatively high normal load and/or continuous or repeated motion will not significantly affect a thickness of the solid friction coating 102, and therefore the friction coefficient between the ball stud 110 and the ball race 108 and the resultant friction torque of the ball joint assembly 100 are more stable than in the conventional ball joint 20.

According to various embodiments, the friction torque of the ball joint assembly 100 is more stable and predictable than in conventional ball joints because the solid friction coating 102 is applied at a specific thickness, and has a specific hardness and coefficient of friction. The solid friction coating 102 is able to withstand a relatively high normal load and/or continuous or repeated motion without experiencing a significant reduction in its thickness. Therefore, the friction coefficient between the ball stud 110 and the ball race 108 and the resultant friction torque of the ball joint assembly 100 remain more stable and, thus, is more predictable over time as compared to the conventional ball joint, such as the ball joint 20.

To achieve a wide range of friction torque, the friction coefficient between the outer surface 111 of the ball stud 110 and the inner surface 109 of the ball race 108 is higher than that in a conventional ball joint 20. Further, in order to prevent excessive wear between the ball stud 100 and the ball race 108, the friction coefficient should not be excessively high as well. Therefore, in one embodiment, a friction coefficient between the outer surface 111 of the ball stud 110 and the inner surface 109 of the ball race 108 is between 0.08 to 0.2.

In one embodiment, the solid friction coating 102 is made of a mixture of silicone dioxide and polytetrafluoroethylene. As described above, the solid friction coating 102 can be applied to or positioned between one or more components of the ball joint assembly 100. A method of applying a solid friction coating to one or more components of a ball joint assembly 100 is described herein. In one embodiment, before the solid friction coating 102 is applied to a desired component surface, any grease of lubricant is removed from the desired component surface to provide a clean surface to which the solid friction coating 102 can adhere and facilitate maintaining a predictability of the friction torque.

After the grease or lubricant has been removed from the desired component surface, the solid friction coating 102 is applied and then allowed to bake for a suitable amount of time, such as 30 minutes to 60 minutes in certain embodiments. This baking process is typically performed at a temperature ranging between 200° C. and 300° C., and, in certain embodiments, at a temperature ranging between 230° C. and 280° C. Further, in certain embodiments a thickness of the solid friction coating 102 is between 10 microns and 40 microns, or, more specifically, the solid friction coating 102 has a thickness of 15 microns to 30 microns. Further, in certain embodiments the solid friction coating 102 has a hardness of 170 N/mm$^2$ to 230 N/mm$^2$. In one embodiment, when the solid friction coating 102 is applied to at least the head portion 112 of the ball stud 110, the solid friction coating 102 substantially covers the head portion 112 and may extend onto at least a portion of the neck 122 and/or the shaft 118 of the ball stud 110.

In one embodiment, any surface which is not coated with the solid friction coating 102, but that is configured to contact the ball race 108 is burnished, polished, or otherwise finished or coated with a low friction coating to prevent or minimize frictional wear to the ball race 108. In certain embodiments, the low friction coating includes a material such as polytetrafluoroethylene (PTFE). For instance, in one embodiment, the inner surface 142 of the housing 104 contacts the second engagement surface 146 of the ball race 108, and the inner surface 142 of the housing 104 is burnished, polished or otherwise finished or coated with a low friction coating to prevent or minimize wear to the ball race 108. Similarly, in another embodiment, the inner surface 140 of the piston 130 contacts the first engagement surface 144 of the ball race 108, and the inner surface 140 of the piston 130 is burnished, polished or otherwise finished or coated with a low friction coating to prevent or minimize wear to the ball race 108. This also helps to achieve stable friction torque while also preventing excessive sliding friction at the interface between the housing 104 and the ball race 108. To further achieve predictable friction torque, in some embodiments, at least some portions of ball race 108 (e.g. surface 109) and head portion 112 (e.g. surface 111) are treated with a degreaser to remove contaminants from the respective surfaces of the ball race 108 and head portion 112.

In an alternative embodiment, the inner surface 136 of the housing 104 contacts the outer surface of the piston ring 132, and the inner surface 136 of the housing 104 is burnished, polished or otherwise finished or coated with a low friction coating to prevent or minimize wear to the piston ring 132. While the addition of a low friction coating to specific surfaces of housing 104 or piston 130 can help to prevent or minimize wear against opposing surfaces which may contact these surfaces, it should be noted that a low friction coating does not need to be applied to any surface of the housing 104 or piston 130.

In one or more embodiments disclosed herein, the solid friction coating provides a friction torque in a rotational direction and/or an axial direction that is stable under a broad range of temperatures. The solid friction coating facilitates providing: (a) a friction torque in the rotational direction and/or the axial direction that is stable when there is continuous relative motion between the ball stud and the ball race and/or a relatively high normal load is applied between these components; (b) a friction torque in the rotational direction and/or the axial direction that is predictable for a given normal load applied between the ball race and the ball stud; and/or (c) a friction torque in the rotational direction or the axial direction that is controllable by varying the normal load applied between the ball race and the ball stud.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended the scope be defined by the claims appended hereto. Additionally, the features of various implementing embodiments may be combined to form further embodiments of the disclosure.

What is claimed is:

1. A ball joint assembly comprising:
    a housing having a first end and a second end opposite the first end, the housing at least partially defining a cavity;
    a ball stud including a head portion positioned within the cavity and a shaft connected to the head portion, the shaft extending through an opening at the second end of the housing;
    a ball race positioned within the cavity at the first end of the housing, the ball race having an inner surface, wherein a portion of the ball race extends past the opening at the second end of the housing;
    an interface defined between the inner surface of the ball race and an outer surface of the head portion; and
    a solid friction coating positioned within the interface, the solid friction coating coupled to at least one of the inner surface of the ball race and the outer surface of the head portion, wherein the solid friction coating has a hardness of 170 N/mm$^2$ to 230 N/mm$^2$; wherein a central axis of the housing is defined between the first end of the housing and the second end of the housing, the central axis extending through a centerline of the ball joint, an angle A2 between an inner surface of the housing and the central axis is between 8 degrees and 15 degrees, an angle B2 between a lower portion of the ball race and the central axis is between 8 degrees and 15 degrees, and a first gap defines a difference in angle between B2 and A2.

2. The ball joint assembly of claim 1 wherein the solid friction coating is applied to the inner surface of the ball race.

3. The ball joint assembly of claim 1 wherein the solid friction coating comprises a mixture of silicone dioxide and polytetrafluoroethylene.

4. The ball joint assembly of claim 1 wherein the ball race comprises a first ball race section positioned about a first portion of the ball portion and a second ball race section positioned about a second portion of the ball portion.

5. The ball joint assembly of claim 1 wherein a friction coefficient between the outer surface of the ball stud and the inner surface of the bail race is 0.08 to 0.2.

6. The ball joint assembly of claim 1, further comprising a piston positioned within the cavity, the piston configured to seal an opening at a first end of the housing, wherein an angle A1 between an inner surface of the piston and the central axis is between 8 degrees and 15 degrees, an angle B1 between an upper portion of the ball race and the central axis is between 8 degrees and 15 degrees.

7. The ball joint assembly of claim 6, wherein a second gap defines a difference in angle between B1 and A1.

8. A ball joint assembly comprising:
    a housing having a first end and a second end opposite the first end, the housing at least partially defining a cavity;
    a ball stud including a head portion positioned within the cavity and a shaft connected to the head portion, the shaft extending through an opening at the second end of the housing;
    a ball race positioned within the cavity, the ball race positioned about at least a portion of the head portion of the ball stud, wherein a portion of the ball race extends past the opening at the second end of the housing;
    a solid friction coating applied to at least one of an inner surface of the ball race and an outer surface of the head portion of the ball stud; and
    a piston positioned within the cavity, the piston configured to seal an opening at the first end of the housing, wherein a central axis of the housing is defined between the first end of the housing and the second end of the housing, the central axis extending through a centerline of the ball joint and parallel to an outer surface of the piston, an angle A1 between an inner surface of the piston and the central axis is between 8 degrees and 15 degrees, an angle B1 between an upper portion of the ball race and the central axis is between 8 degrees and 15 degrees, and a first gap defines a difference in angle between B1 and A1.

9. The ball joint assembly of claim 8 further comprising a piston ring positioned about the outer surface of the piston to seal the housing.

10. The ball joint assembly of claim 8 wherein an angle A2 between the inner surface of the housing and the central axis is between 8 degrees and 15 degrees.

11. The ball joint assembly of claim 10 wherein an angle B2 between the lower portion of the ball race and the central axis is between 8 degrees and 15 degrees.

12. The ball joint assembly of claim 8 wherein the ball race comprises a first ball race portion positioned about a first portion of the head portion and a second ball race portion positioned about a second portion of the head portion.

13. assembly of claim 12 wherein an angle A2 between the first ball race portion and the central axis, is between 8 degrees and 15 degrees.

14. The ball joint assembly of claim 12 wherein an angle B2 between the second ball race portion and the central axis is between 8 degrees and 15 degrees.

15. The ball joint assembly of claim 11 wherein a second gap defines a difference in angle, between B2 and A2.

16. A method of assembling a ball joint, the method comprising:
configuring a housing to at least partially define a cavity having a first end and a second end opposite the first end;
positioning a head portion of a ball stud within the cavity, the ball stud including a shaft extending from the head portion;
positioning a ball race about at least a portion of the head portion of the ball stud so that the shaft extends through an opening in the cavity at the second end of the housing; and
a piston within the cavity, the piston configured to seal an opening at a first end of the housing, wherein a central axis is defined between the first end of the housing and the second end of the housing and extends through a centerline of the ball joint and parallel to an outer surface of the piston, the method further comprising:
positioning the piston within the cavity to define a first angle A1 between an inner surface of the piston and the central axis;
defining a second angle A2 between an inner surface of the housing and the central axis; and
positioning the ball race within the cavity to define a third angle B1 between an upper portion of the ball race and the central axis and a fourth angle B2 between a lower portion of the ball race and the central axis, wherein a first gap defines a difference in angle between B1 and A1, and a second gap defines a difference in angle between b2 and A2.

17. The method of claim 16 further comprising:
applying a solid friction coating to at least one of an inner surface of the ball race and an outer surface of the head portion of the ball stud.

18. A ball joint assembly comprising:
a housing at least partially defining a cavity;
a ball stud including a head portion positioned within the cavity and a shaft extending from the head portion;
a ball race positioned within the cavity, the ball race positioned about at least a portion of the head portion of the ball stud;
a solid friction coating applied to at least one of an inner surface of the ball race and an outer surface of the head portion of the ball stud; and
a piston positioned within the cavity, the piston configured to seal an opening at a first end of the housing,
wherein a central axis of the housing is defined between the first end of the housing and an opposing second end of the housing, the central axis extending through a centerline of the ball joint and parallel to an outer surface of the piston, a first angle Al between an inner surface of the piston and the central axis is between 8 degrees and 15 degrees, a second angle A2 between an inner surface of the housing and the central axis is between 8 degrees and 15 degrees, a third angle B1 between an upper portion of the ball race and the central axis is between 8 degrees and 15 degrees, a fourth angle B2 between a lower portion of the ball race and the central axis is between 8 degrees and 15 degrees, a first gap defines a difference in angle between B1 and A1 , and a second gap defines a difference in angle between B2 and A2.

19. The ball joint assembly of claim 18 wherein the first gap is between −2 degrees to 2 degrees.

20. The ball joint assembly of claim 18 wherein the second gap is between −2 degrees to 2 degrees.

21. The ball joint assembly of claim 18, wherein the solid friction coating has a thickness that is greater than or equal to 15 microns and less than or equal to 30 microns.

22. The ball joint assembly of claim 18, wherein the shaft extends through an opening at the second end of the housing, wherein a portion of the ball race extends past the opening at the second end of the housing.

* * * * *